United States Patent
Kim et al.

(10) Patent No.: US 12,282,592 B2
(45) Date of Patent: Apr. 22, 2025

(54) CO-LOCATED FULL-BODY GESTURES

(71) Applicants: Daekun Kim, Santa Monica, CA (US);
Lei Zhang, Ann Arbor, MI (US);
Youjean Cho, New York, NY (US);
Ava Robinson, Solana Beach, CA (US);
Yu Jiang Tham, Seattle, WA (US);
Rajan Vaish, Beverly Hills, CA (US);
Andrés Monroy-Hernández, Seattle, WA (US)

(72) Inventors: Daekun Kim, Santa Monica, CA (US);
Lei Zhang, Ann Arbor, MI (US);
Youjean Cho, New York, NY (US);
Ava Robinson, Solana Beach, CA (US);
Yu Jiang Tham, Seattle, WA (US);
Rajan Vaish, Beverly Hills, CA (US);
Andrés Monroy-Hernández, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 45 days.

(21) Appl. No.: 17/901,483

(22) Filed: Sep. 1, 2022

(65) Prior Publication Data
US 2024/0077933 A1 Mar. 7, 2024

(51) Int. Cl.
*G06F 3/01* (2006.01)
*G06T 7/70* (2017.01)
(Continued)

(52) U.S. Cl.
CPC ............... *G06F 3/011* (2013.01); *G06T 7/70* (2017.01); *G06T 19/006* (2013.01); *G06V 40/23* (2022.01);
(Continued)

(58) Field of Classification Search
None
See application file for complete search history.

(56) References Cited

U.S. PATENT DOCUMENTS

| 10,496,253 B2 | 12/2019 | Keller |
| 10,936,280 B2 | 3/2021 | Lin |

(Continued)

FOREIGN PATENT DOCUMENTS

| KR | 20200091258 A | 7/2020 |
| KR | 20200100259 A | 8/2020 |

OTHER PUBLICATIONS

International Search Report and Written Opinion for International Application No. PCT/US2023/028708, dated Nov. 3, 2023 (Mar. 11, 2023)—9 pages.

(Continued)

*Primary Examiner* — Daniel F Hajnik
*Assistant Examiner* — Jed-Justin Imperial
(74) *Attorney, Agent, or Firm* — CM Law; Stephen J. Weed (57) ABSTRACT

A method for detecting full-body gestures by a mobile device includes a host mobile device detecting the tracked body of a co-located participant in a multi-party session. When the participant's tracked body provides a full-body gesture, the host's mobile device recognizes that there is a tracked body providing a full-body gesture. The host mobile device iterates through the list of participants in the multi-party session and finds the closest participant mobile device with respect to the screen-space position of the head of the gesturing participant. The host mobile device then obtains the user ID of the closest participant mobile device and broadcasts the recognized full-body gesture event to all co-located participants in the multi-party session, along with the obtained user ID. Each participant's mobile device may then handle the gesture event as appropriate for the multi-party session. For example, a character or costume may be assigned to a gesturing participant.

20 Claims, 5 Drawing Sheets

(51) Int. Cl.
*G06T 19/00* (2011.01)
*G06V 40/20* (2022.01)
*H04W 4/06* (2009.01)

(52) U.S. Cl.
CPC ......... *H04W 4/06* (2013.01); *G06T 2219/024* (2013.01)

(56) References Cited

U.S. PATENT DOCUMENTS

| | | |
|---|---|---|
| 11,406,896 B1* | 8/2022 | Cheung ................. G06V 40/20 |
| 2004/0091848 A1 | 5/2004 | Nemitz |
| 2006/0003824 A1 | 1/2006 | Kobayashi et al. |
| 2007/0124507 A1 | 5/2007 | Gurram et al. |
| 2008/0141147 A1 | 6/2008 | Buhrke et al. |
| 2011/0165939 A1 | 7/2011 | Borst et al. |
| 2011/0314381 A1 | 12/2011 | Fuller et al. |
| 2012/0210254 A1 | 8/2012 | Fukuchi et al. |
| 2012/0284426 A1 | 11/2012 | Smith et al. |
| 2013/0211843 A1* | 8/2013 | Clarkson ................. G06F 3/017 704/275 |
| 2013/0307856 A1 | 11/2013 | Keane et al. |
| 2014/0080109 A1 | 3/2014 | Haseltine et al. |
| 2014/0282013 A1 | 9/2014 | Amijee |
| 2015/0165310 A1 | 6/2015 | Rebh et al. |
| 2015/0278586 A1 | 10/2015 | Madhusudhanan et al. |
| 2016/0274705 A1 | 9/2016 | Kapadia et al. |
| 2016/0350973 A1 | 12/2016 | Shapira et al. |
| 2018/0053351 A1 | 2/2018 | Anderson |
| 2019/0026559 A1 | 1/2019 | Zhan et al. |
| 2019/0114061 A1 | 4/2019 | Daniels et al. |
| 2019/0371071 A1 | 12/2019 | Lyons |
| 2020/0042286 A1 | 2/2020 | Bui et al. |
| 2020/0118343 A1 | 4/2020 | Koblin et al. |
| 2020/0326831 A1 | 10/2020 | Marr |
| 2020/0334463 A1 | 10/2020 | Shapira |
| 2020/0338451 A1 | 10/2020 | Wang |
| 2021/0044779 A1* | 2/2021 | Prins ................... H04L 12/1827 |
| 2021/0081031 A1 | 3/2021 | Perlin et al. |
| 2021/0149190 A1* | 5/2021 | Johnson ................. G06F 3/011 |
| 2021/0256865 A1 | 8/2021 | Koshiba et al. |
| 2021/0306387 A1 | 9/2021 | Smith et al. |
| 2021/0409516 A1 | 12/2021 | Saraf et al. |
| 2022/0221716 A1 | 7/2022 | Welch et al. |
| 2022/0398798 A1 | 12/2022 | Baradaran |

OTHER PUBLICATIONS

International Search Report and Written Opinion for International Application No. PCT/US2023/028717, dated Nov. 8, 2023 (Aug. 11, 2023)—10 pages.

* cited by examiner

CO-LOCATED FULL-BODY GESTURES

TECHNICAL FIELD

The present disclosure relates to mobile devices. More particularly, but not by way of limitation, the present disclosure describes techniques for detecting full-body gestures from co-located participants in a multi-party session using cameras of the mobile devices, determining which participant triggered the gesture, and propagating the detected gesture to the co-located session participants.

BACKGROUND

Mobile devices such as smartphones may be adapted to recognize gestures to trigger events within software applications executing on the mobile devices. The cameras of the mobile device may be adapted to detect a gesture in an image and to process the gesture to identify the event that is to be triggered in response to the gesture. For example, the camera may recognize that a person in the image is showing one finger and then select a corresponding option from a menu of the software application. For gesture detection, the biometric components of the mobile device may include components to detect expressions (e.g., hand expressions, facial expressions, body gestures, eye tracking, and the like) based on images taken by the camera of the mobile device. Existing body tracking technology may be adapted to detect body gestures within the images taken by the camera. However, a user's mobile device cannot detect many of her own body gestures since the user's mobile device does not have a full camera view of her body when held in front of her by her hand. As a result, the detectable body gestures generally have been limited to hand and facial expressions and a limited number of gestures within the field of view when the user holds the camera in front of her body.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

In a co-located augmented reality (AR) session, full-body gestures (waving, jumping, kicking, etc.) can be a useful interaction method. As an example scenario, take Alice and Bob, who are both in a co-located AR session, holding their mobile devices toward each other. Existing body tracking technology enables detecting body gestures, but Alice's mobile device cannot detect her own body gestures (because Alice's mobile device does not have a full camera view of her body when held in front of her with her hand). In this scenario, only Bob's camera of Bob's mobile device can detect Alice's body gestures. However, there is no mechanism on Bob's mobile device to recognize that the gesture is the gesture of Alice and to instruct Alice's mobile device that she has performed a full body gesture so that software on Alice's mobile device may respond accordingly. Thus, a mechanism is needed for enabling a body gesture detected on a secondary mobile device (in this scenario, Bob's mobile device) to be associated back to the mobile device of the user that triggered the gesture (in this scenario, Alice's mobile device).

Accordingly, a process is described herein for detecting full-body gestures corresponding to a gesture event, determining which user triggered the gesture event, and propagating the gesture event among co-located participants.

In a sample configuration, waving may be provided as an example of a full-body gesture. In the sample configuration, a host mobile device detects the tracked body of a co-located participant in a multi-party session. The participant's tracked body begins to wave, and the host's mobile device recognizes that there is a tracked body waving. The host mobile device iterates through the list of co-located participants in the multi-party session and finds the closest participant mobile device with respect to the screen-space position of the waving body's head. The host mobile device then obtains the user ID of the closest participant mobile device. The host mobile device may then broadcast the recognized full-body gesture event (waving by session participant) to all co-located participants in the multi-party session, along with the obtained user ID. Each participant's mobile device may then handle the gesture event as appropriate for the multi-party session. The mobile device of the waving participant may recognize that its user is the participant that performed the waving gesture and respond to the waving gesture event as appropriate for the co-located session. For example, a character or costume may be assigned to the waving participant in an AR session or the AR environment may be changed in response to the waving gesture event.

The system described herein provides a method for implementing a gesture event detected by another co-located party in a multi-party session. The method includes generating a multi-party session (e.g., a multi-party augmented reality (AR) session) including at least two co-located session participants. The multi-party session may enable all session participants to communicate with one another using their respective mobile devices. A gesture event of a co-located session participant is detected using a camera of a mobile device, and a screen-space position of a head of the co-located session participant who generated the gesture event is captured. The detected gesture event may be a full-body gesture (e.g., a T pose), an upper body gesture (e.g., a waving hand), or a lower body gesture (e.g., a foot click) of the co-located session participant. A captured screen-space position of the head of the co-located session participant who generated the gesture event is compared to a screen-space position of each co-located participant in the multi-party session, and a user identification (ID) of the co-located participant that is closest to the screen-space position of the head of the co-located session participant who generated the gesture event is determined. The detected gesture event and the determined user ID may then be broadcasted to at least the co-located session participants in the multi-party session. If the mobile device corresponds to the user ID or may respond to a gesture event from the determined user ID, an action may be performed in the multi-party session that corresponds to the detected gesture event received from another mobile device. For example, the detected gesture event may trigger a full screen effect on the mobile devices of at least one session participant, visual effects attached to a body of at least one session participant, toggling of an object in the session, or playing of an animation in the session.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below. A sample system and method for detecting full-body gestures, determining which co-located participant in a multi-party session triggered the gesture event, and propagating the gesture event among the co-located participants will be described with respect to FIGS. 1-4.

Figure 1:
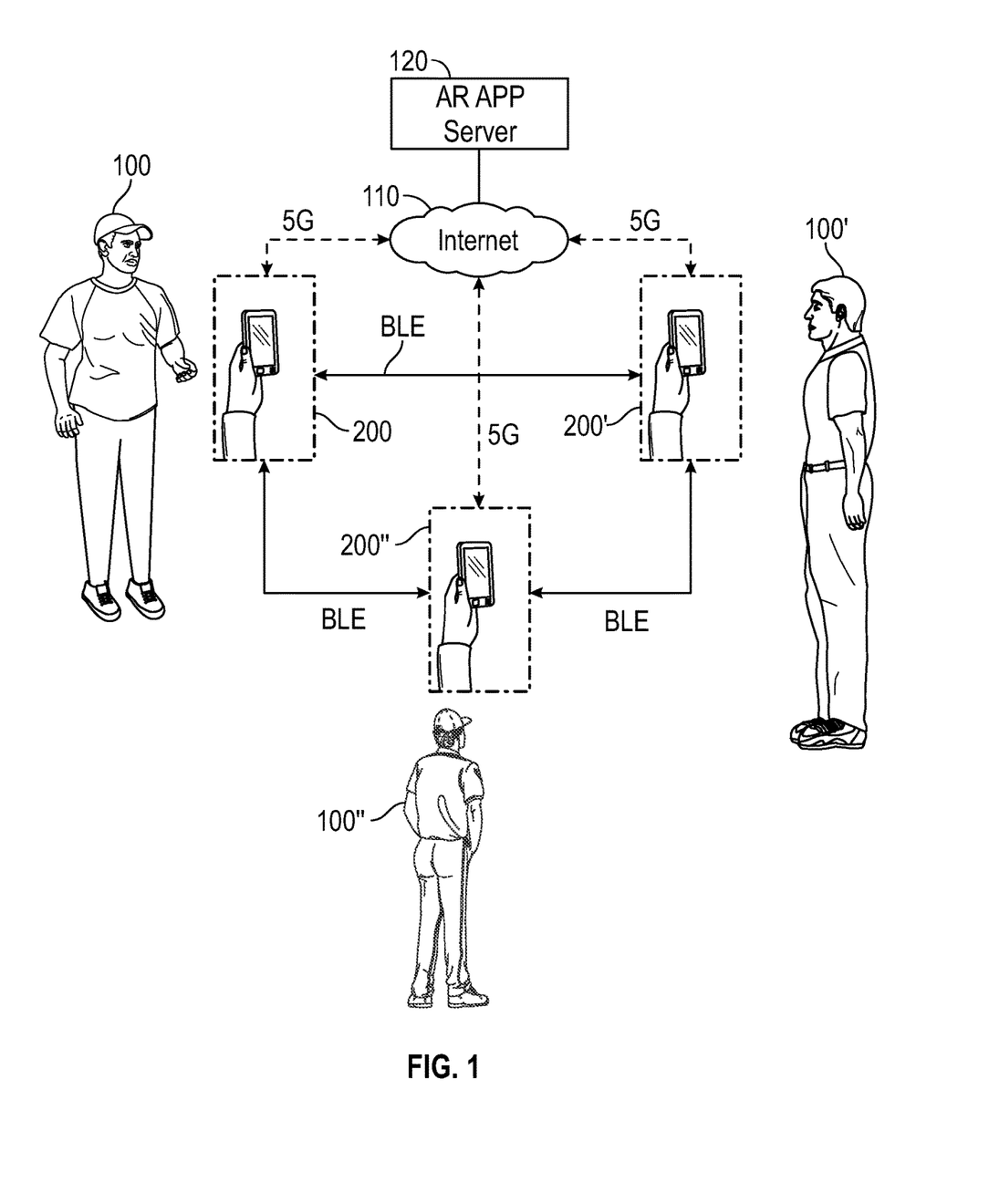
FIG. 1 is a diagram illustrating multiple participants of a co-located augmented reality (AR) session in a sample configuration.

FIG. 1 is a diagram illustrating multiple participants 100, 100', and 100" of a co-located augmented reality (AR) session in a sample configuration. While three participants are illustrated, the co-located AR session may include from two to as many participants as can be supported by the AR session software (e.g., 64 participants). Each participant 100, 100', and 100" has a mobile device 200, 200', and 200", respectively, that the participant 100, 100', and 100" uses to participate in the co-located AR session. As illustrated, each mobile device 200, 200', and 200" communicates with each other co-located mobile device 200, 200', and 200" using, for example, BLUETOOTH® Low Energy (BLE) or any other appropriate local area communications technologies. During the co-located AR session, each participant 100, 100', and 100" may share one or more AR applications with each other participant 100, 100', and 100". In addition, each mobile device 200, 200', and 200" may be wirelessly connected to the Internet 110 using a suitable broadband cellular network technology (e.g., 5G) and enabled to communicate with a remote AR application server 120 that may provide the AR applications for the co-located AR sessions. For example, the AR application server 120 may provide AR applications such as Lenses of the type available from Snap, Inc. of Santa Monica, CA to be shared amongst the mobile devices 200, 200', and 200" during the co-located AR sessions. The following description will utilize Lenses as an example of AR applications that may be used in a co-located session as described herein; however, those skilled in the art will appreciate that other AR applications or other multi-party applications may be similarly shared in multi-party sessions as described herein.

AR application server 120 may comprise one or more computing devices as part of a service or network computing system, which includes a processor, a memory, and network communication interface to communicate over the Internet 110 with the mobile devices 200, 200', and 200". In sample configurations, one or more of the mobile devices 200, 200', and 200" also may be paired with an electronic eyewear device (not shown) via a high-speed wireless connection. The AR application server 120 may store a gallery of snapshots and AR objects that are maintained by the AR application server 120 for access by each participant 100, 100', and 100" and invoked by Internet communications providing links to the stored snapshots and AR objects in the gallery.

In a sample configuration, an AR session may be created for co-located participants 100, 100', and 100" by invoking a connection template of the type available, for example, from Snap, Inc. of Santa Monica, CA. The connection template allows users of a social media network such as SNAPCHAT® available from Snap, Inc. of Santa Monica, CA to join with social media friends to share a common AR application in a common AR space at the same location or remotely. The connection template may include a re-usable invitation flow that manages how users join an AR session with their social media friends and a relay system that enables the participants 100, 100', and 100" in the AR session to pass messages amongst themselves. An avatar system also may be provided to provide a co-presence when one or more of the participants 100, 100', or 100" are not co-located with the other participants 100, 100', and 100" in the shared AR session. In sample configurations, the connection template also may provide examples of synchronizing object instantiation and transform manipulation within a shared AR session.

In an example, a shared AR session may implement a shared AR application such as Connected Lenses available from Snap, Inc. of Santa Monica, CA. Connected Lenses are a type of Lens that allows participants in a shared session to pass and stored data between mobile devices 200, 200', and 200" that are running the same Lens, whether the mobile devices 200, 200', and 200" are co-located or in different locations. Connected Lenses thus allow the participants 100, 100', and 100" to create AR experiences that social media friends can experience together at the same time and return to over time. Sample AR experiences may permit the participants 100, 100', and 100" to instantiate objects, modify the position/rotation/scale of an object that is synchronized across mobile devices 200, 200', and 200", as well as to send messages amongst the participants 100, 100', and 100". When the participants 100, 100', and 100" are co-located, the participants 100, 100', and 100" may reference the same co-located AR experience on their respective mobile devices 200, 200', and 200". To invite social media friends to such a co-located AR experience, a participant 100, 100', or 100" may first map the area and then, in the case of Connected Lenses, the Lens can show a code (e.g., Snapcode) that the other participants 100, 100', and 100" can scan to join the co-located AR experience. The mapped area does not provide the geometry of the scene but allows the participants 100, 100', and 100" to share the same coordinate frame with the other participants 100, 100', and 100". A single AR application such as a Lens may contain a single-user experience, a remote experience, or a co-located experience, as desired by the participants 100, 100', and 100".

In the example of a Connected Lens, the Lens may create an AR session that may be joined by others using a Connected Lens module. Adding the Connected Lens module converts a Lens to a Connected Lens having a Call to Action button that a participant 100, 100', or 100" may tap to enter into a Connected Lens State, at which point a participant 100, 100', or 100" receives the functionality to invite the other participants 100, 100', and 100" into a connected AR session. When a participant 100, 100', or 100" enters a Lens through an invitation, the participant 100, 100', or 100" will enter directly into the Connected Lens State. At this point, each connected participant 100, 100', and 100" will not have access to any camera mode except to change between front and rear cameras. Also, instead of a carousel of Lenses for selection, the participants 100, 100', and 100" will have an Action bar that allows the participant 100, 100', and 100" to see who else is in the connected AR session. Within the connected AR session, each participant 100, 100', and 100" may send a message to every other participant in the connected AR session and receive messages from every other participant in the connected AR session. To facilitate communication, each participant in a connected AR session is assigned a user ID for the connected AR session.

When a participant 100, 100', or 100" first opens a Connected Lens, she is first introduced to a splash screen that introduces the participant 100, 100', or 100" to the current Connected Lens experience and provides her with the option to start interacting with a connected AR session by selecting the Call to Action button to launch the Connected Lens. Once the participant 100, 100', or 100" completes the invitation process, she is brought into the connected AR session where the Lens can send data back and forth between each participant 100, 100', and 100".

It will be appreciated by those skilled in the art that the co-located session may also be shared on electronic eyewear devices such as SPECTACLES™ available from Snap, Inc. of Santa Monica, CA., by setting up a multiplayer session using a Connected Lenses Module to make a Lens usable for multi-party applications.

Figure 2:
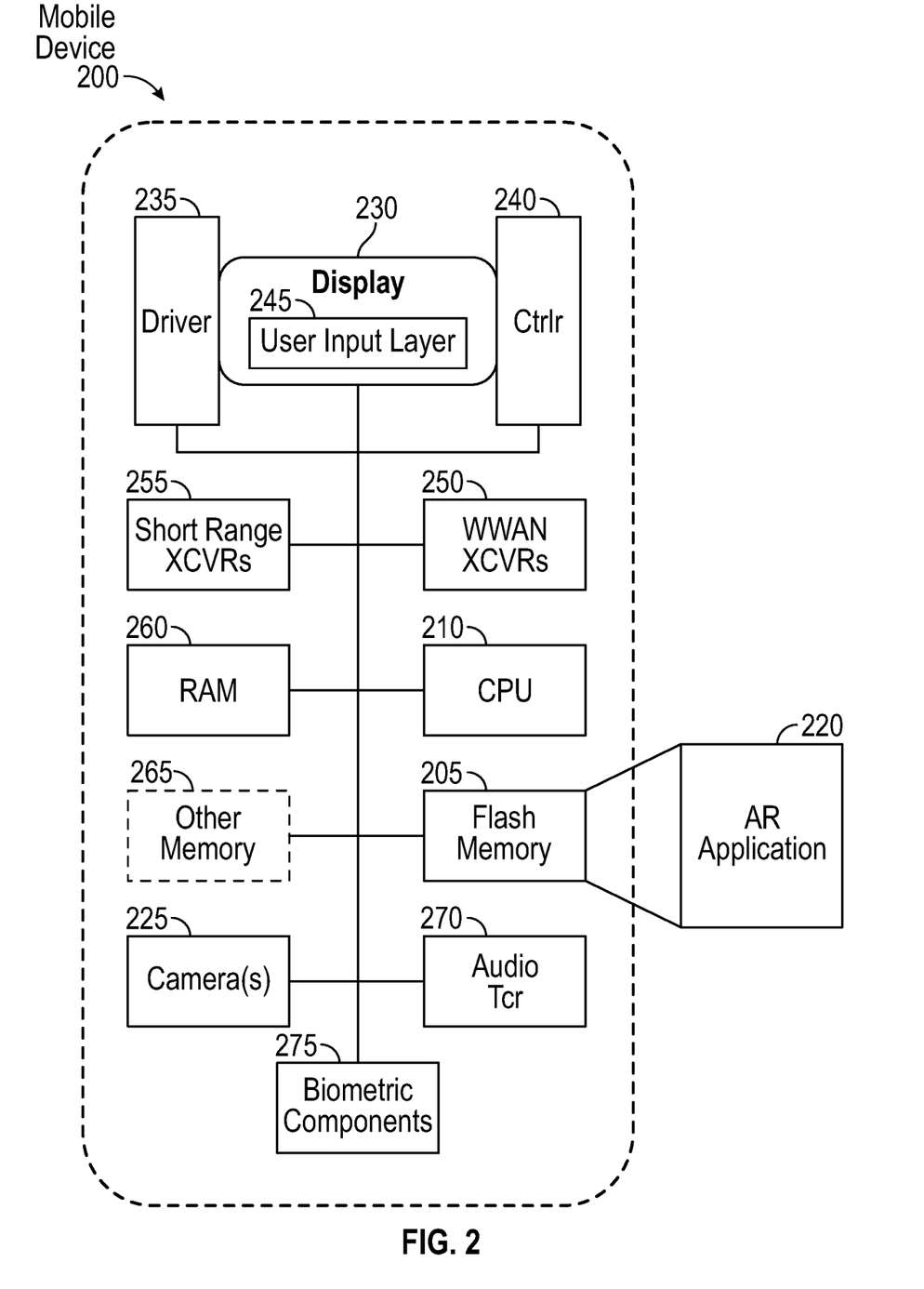
FIG. 2 is a block diagram of the electronic components of a mobile device adapted for implementing co-located AR sessions in a sample configuration.

FIG. 2 is a block diagram of the electronic components of a mobile device 200, 200', or 200" adapted for implementing co-located AR sessions in a sample configuration. Mobile device 200 may present interfaces (e.g., AR interfaces) to a participant 100 and also may be used to extend the interfaces to an associated electronic eyewear device (not shown) in sample configurations. Mobile device 200 may include a flash memory 205 that stores programming to be executed by the CPU 210 to perform all or a subset of the functions described herein. The mobile device 200 may further include a camera 225 that comprises one or more visible-light cameras (visible-light cameras with overlapping fields of view) or at least one visible-light camera and a depth sensor with substantially overlapping fields of view. Flash memory 205 may further include multiple images or video, which are generated via the camera 225.

The mobile device 200 may further include an image display 230, a mobile display driver 235 to control the image display 230, and a display controller 240. In the example of FIG. 2, the image display 230 may include a user input layer 245 (e.g., a touchscreen) that is layered on top of or otherwise integrated into the screen used by the image display 230. Examples of touchscreen-type mobile devices that may be used include (but are not limited to) a smartphone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 2 therefore provides a block diagram illustration of the example mobile device 200 with a user interface that includes a touchscreen input layer 245 for receiving input (by touch, multi-touch, or gesture, and the like, by hand, stylus, or other tool) and an image display 230 for displaying content.

As shown in FIG. 2, the mobile device 200 includes at least one digital transceiver (XCVR) 250, shown as WWAN (Wireless Wide Area Network) XCVRs, for digital wireless communications via a wide-area wireless mobile communication network. The mobile device 200 also may include additional digital or analog transceivers, such as short-range transceivers (XCVRs) 255 for short-range network communication, such as via NFC, VLC, DECT, ZigBee, BLUETOOTH®, or WI-FI®. For example, short range XCVRs 255 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 200, the mobile device 200 also may include a global positioning system (GPS) receiver. Alternatively, or additionally, the mobile device 200 may utilize either or both the short range XCVRs 255 and WWAN XCVRs 250 for generating location coordinates for positioning. For example, cellular network, WI-FI®, or BLUETOOTH® based positioning systems may generate very accurate location coordinates, particularly when used in combination. Such location coordinates may be transmitted to the mobile device 200 over one or more network connections via XCVRs 250, 255.

The transceivers 250, 255 (i.e., the network communication interface) may conform to one or more of the various digital wireless communication standards utilized by modern mobile networks. Examples of WWAN transceivers 250 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers also may incorporate broadband cellular network technologies referred to as "5G." In sample configurations, the transceivers 250, 255 provide two-way wireless communication of information including digitized audio signals, still image and video signals, web page information for display as well as web-related inputs, and various types of mobile message communications to/from the mobile device 200.

The mobile device 200 may further include a microprocessor that functions as the central processing unit (CPU) 210. CPU 210 is a processor having elements structured and arranged to perform one or more processing functions, typically various data processing functions. Although discrete logic components could be used, the examples utilize components forming a programmable CPU. For example, a microprocessor may include one or more integrated circuit (IC) chips incorporating the electronic elements to perform the functions of the CPU 210. The CPU 210 may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 210 or processor hardware in smartphone, laptop computer, and tablet.

The CPU 210 serves as a programmable host controller for the mobile device 200 by configuring the mobile device 200 to perform various operations in accordance with instructions or programming executable by CPU 210. For example, such operations may include various general operations of the mobile device 200, as well as operations related to the programming for messaging apps and AR camera applications on the mobile device 200. Although a processor may be configured by use of hardwired logic, typical processors in mobile devices are general processing circuits configured by execution of programming.

The mobile device 200 further includes a memory or storage system for storing programming and data. In the example shown in FIG. 2, the memory system may include flash memory 205, a random-access memory (RAM) 260, and other memory components 265, as needed. The RAM 260 may serve as short-term storage for instructions and data being handled by the CPU 210, e.g., as a working data processing memory. The flash memory 205 typically provides longer-term storage.

In the example of mobile device 200, the flash memory 205 may be used to store programming or instructions for execution by the CPU 210. Depending on the type of device, the mobile device 200 stores and runs a mobile operating system through which specific applications are executed. Examples of mobile operating systems include Google Android, Apple iOS (for iPhone or iPad devices), Windows Mobile, Amazon Fire OS (Operating System), RIM BlackBerry OS, or the like.

The mobile device 200 also may include an audio transceiver 270 that may receive audio signals from the environment via a microphone (not shown) and provide audio output via a speaker (not shown). Audio signals may be coupled with video signals and other messages by a messaging application or social media application implemented on the mobile device 200.

In sample configurations, the mobile device 200 may further include biometric components 275 to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components may include acceleration sensor components (e.g., accelerometer), gravitation sensor components, rotation sensor components (e.g., gyroscope), and so forth. The position components may include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates also can be received from other devices over wireless connections.

In sample configurations, the mobile device 200 may execute mobile augment reality (AR) application software 220 such as SNAPCHAT® available from Snap, Inc. of Santa Monica, CA that is loaded into flash memory 205. As will be described in more detail below with respect to FIGS. 3-4, the mobile AR application software 220 may be executed to create a multi-party session, detect full-body gestures of a participant, determine which session participant triggered the gesture event, and propagate the gesture event among co-located participants in the multi-party session.

Figure 3:
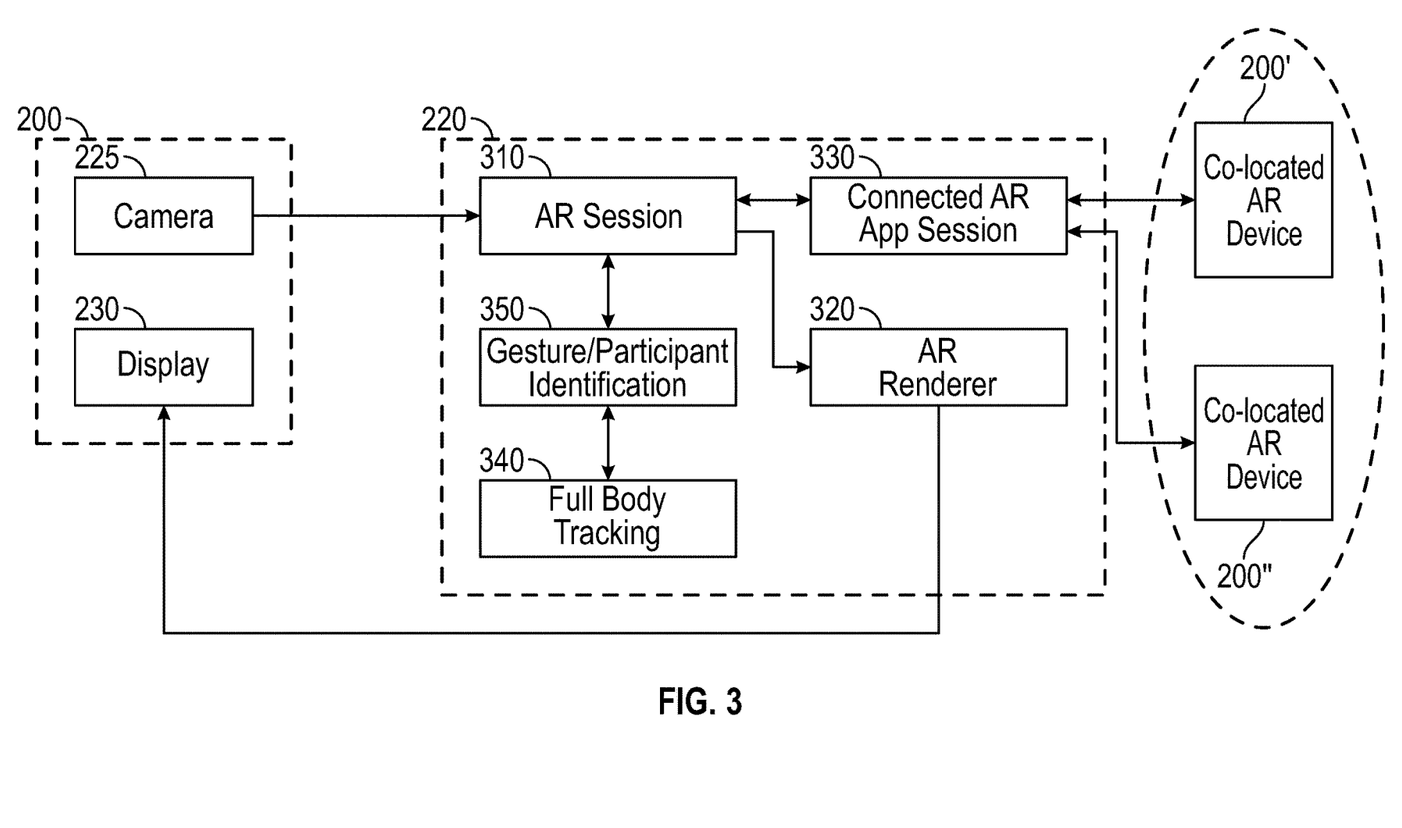
FIG. 3 is a block diagram of the software components for implementing a co-located AR session on the mobile device of FIG. 2 in a sample configuration.

FIG. 3 is a block diagram of the software components for implementing an AR session on the mobile device 200 of FIG. 2 in a sample configuration. As illustrated, the mobile device 200 executes AR application 220 to implement an AR session 310 that is rendered by an AR renderer 320 to the display 230 of the mobile device 200. The AR session may be implemented as a connected AR app session 330 such as a Connected Lens session described above. The connected AR app session 330 controls communications with the other co-located AR devices including mobile device 200' and 200" in the co-located session described with respect to FIG. 1. The Connected Lens in the connected AR app session 330 may function to overlay one or more shared Lenses on the images received from camera 225 of the respective mobile devices 200, 200', and 200" of each participant 100, 100', and 100" in the connected AR app session 330.

In sample configurations, the AR application 220 further implements full body tracking software 340 and gesture/participant identification software 350 during an AR session. Full body tracking software 340 may implement three-dimensional (3D) body templates that allow a participant 100, 100', or 100" to track the position and rotation of joints of a body in 3D in an image captured by the camera 225. One or more bodies may be tracked at the same time, as well as partial bodies. In sample configurations, a 3D model may be rigged to a skeleton that matches what the full body tracking software 340 sees in the image from the camera 225. This allows the AR application (e.g., Lens) to map the movement of a body to the movement of the model.

The 3D rigged model may be based on a stick figure with joints corresponding to the feet, knees, hips, shoulders, spine, neck, head, elbows, hands, and the like of a person. The 3D rigged model assigns all of the joints of the person in the image from the camera 225 to the 3D rigged model for use by the 3D body tracking software 340. The 3D body tracking software 340 then tracks movement of the person in the image from the camera by moving the 3D rigged model with the person as the person moves. Proportions of the 3D rigged model may be adjusted as appropriate to fit the person in the image from the camera 225.

When the camera 225 captures overlapping images of more than one person, it may be impossible to know the position of invisible parts of the body. In this case, the 3D body tracking software 340 may disable or hide the joints that are not being tracked automatically. Individual objects, such as AR objects in the form of Lenses, for example, also may be attached to the tracked body by attaching the AR objects to the individual joints of the person in the image.

To identify gestures performed by the person in the image, a full body trigger template may be implemented that allows different screen effects to be triggered by different body movements, such as custom body gesture (e.g., waving), touch screen triggers and distance between body joints, or a distance between body joints and screen elements identified in a screen transform. The full body trigger template may implement a full-body tracking system for tracking full-body gestures, an upper body tracking system for tracking upper body gestures, or a lower body tracking system for tracking lower body gestures, as appropriate. The full-body tracking system may also track facial features by providing access to face points such as nose, left and right eyes, and left and right ears. The trigger template further specifies what should happen in a corresponding AR application (e.g., Connected Lens) when a trigger event is identified. The triggered event may be a full screen effect, visual effects attached to the body, toggling of an object, playing of an animation, or anything else that may be elicited within the AR application by the trigger event.

In sample configurations, the full body tracking software 340 provides 2D screen points that represent the joints or parts of the body of a person identified in an image and is the basis of the full body tracking template. Sample body movements may include a T pose, a right foot click, a wave, and the like. Each body movement may have a movement trigger script attached to it that allows different movement types to be attached, including a gesture. Each gesture may be composed by a list of pose triggers (e.g., right leg out or right leg click for a right foot click trigger). When a pose is matched to a person in the camera image, the list of behavior triggers is called and matched to the pose. When the pose is matched to a behavior trigger, the corresponding gesture event is activated. The pose may be a movement, such as a wave, which triggers a movement trigger response script to implement the gesture event. For example, a particular body movement by the person in the image may trigger animations and full screen effects associated with behavior scripts associated with AR objects in the AR session.

Figure 4:
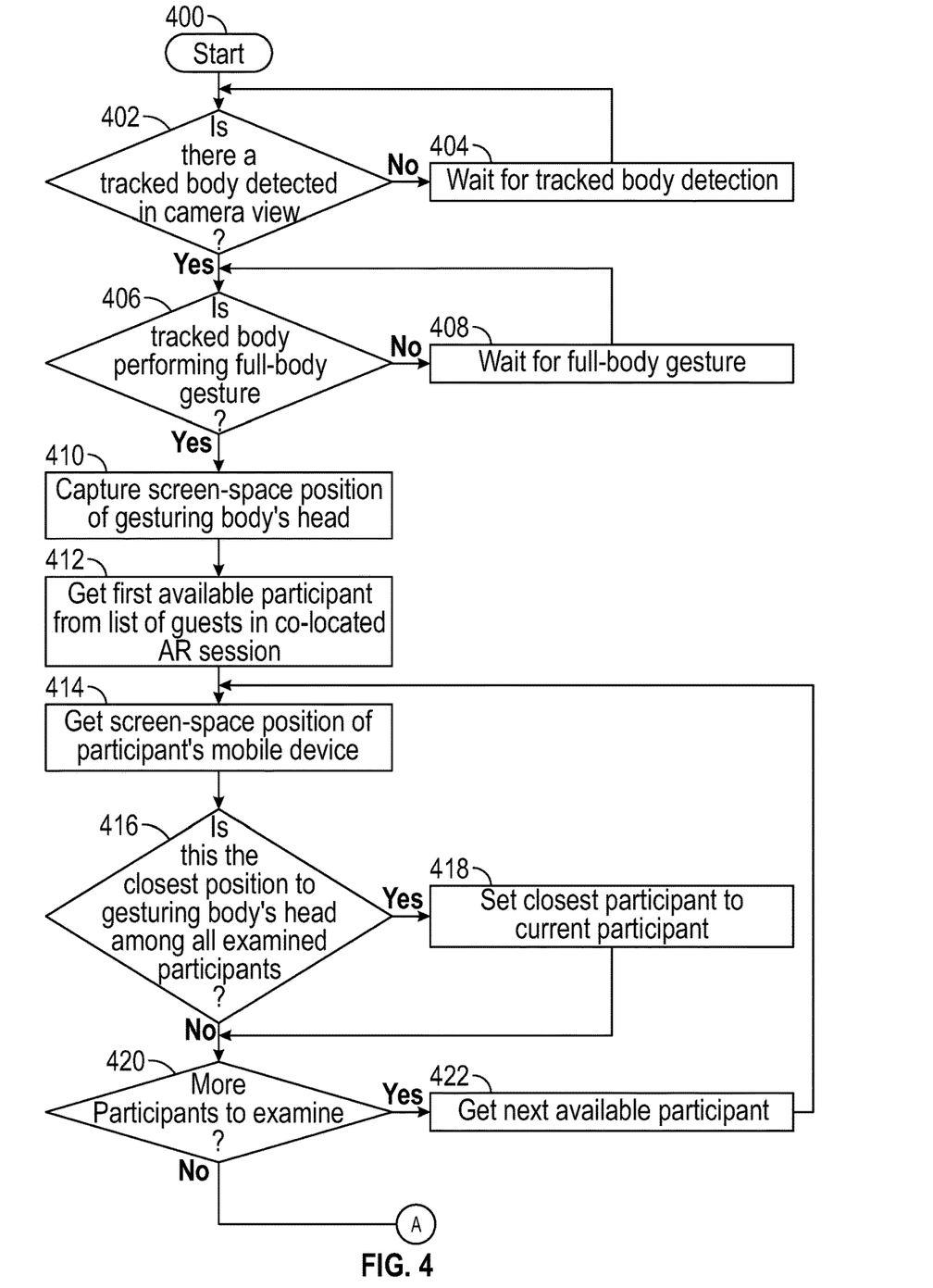
FIG. 4 is a flow chart of a method for detecting a full body gesture, determining which participant made the full body gesture, and propagating the detected gesture to other co-located participants of a multi-party AR session in a sample configuration.

Operation of the gesture/participant identification software 350 for identifying a full-body gesture and the participant who performed the gesture is shown in FIG. 4, which is a flow chart of a method for detecting a full body gesture, determining which participant made the full body gesture, and propagating the detected gesture to other co-located participants of a co-located AR session in a sample configuration.

In sample configurations, the method of FIG. 4 is implemented by the gesture/participant identification software 350 illustrated in FIG. 3. As shown in FIG. 4, the method starts at 400 by determining at 402 if there is a tracked body detected by the full body tracking software 340 in the image received from camera 225 of the mobile device 200. If no tracked body is detected at 402, the process proceeds to 404 to wait for detection of a tracked body. Once a tracked body is detected at 402, a determination is made at 406 as to whether the tracked body is performing full-body gestures. As noted above, full-body gestures such as waving, jumping, or kicking may be detected from movements of the body model that is paired with the received image. If no full-body gesture is detected at 406, the process proceeds to 408 to wait for detection of a full-body gesture. Once a full-body gesture is detected at 406, a screen-space position of the head of the gesturing body is captured at 410.

Once the screen-space position of the head of the gesturing body has been captured at 410, the captured screen-space position of the head of the gesturing body is compared to the screen-space position of each co-located participant in a multi-party session. In particular, the first available participant is obtained from a list of co-located participants in the multi-party AR session at 412. At 414, the screen-space position of the participant's mobile device 200, 200', or 200" is obtained from the session data and compared to the screen-space position of the head of the gesturing body. If the screen-space position of the current participant's mobile device 200, 200', or 200" is determined at 416 to be closer than the screen-space position of any other participant in the AR session, then at 418 the variable "closest participant" is set to the user ID of the current participant. If it is determined at 420 that there are other participants in the AR session that have not yet been examined for proximity to the screen-space position of the head of the gesturing body, then the data for the next available participant is obtained at 422, and steps 414-422 are repeated until all participants in the AR session have been evaluated for proximity to the screen-space position of the head of the gesturing body.

Once all participants in the AR session have been evaluated, the user ID of the closest participant to the head of the gesturing body is obtained at 424. The captured gesture event (e.g., wave, jump, or kick) is then broadcast at 426 to the other participants in the co-located AR session along with the user ID of the participant that generated the gesture event. At 428, each AR device 200, 200', and 200" for each participant 100, 100', and 100" in the AR session handles the gesture event as appropriate given the nature of the gesture event and the user ID of the person who generated the gesture event. The process then ends at 430.

Thus, in the disclosed examples, a participant in a multi-party co-located session may generate full-body gestures that cannot be recognized by that participant's mobile device but that can be recognized by the mobile device(s) of other co-located participants and used to trigger gesture events that otherwise would not be recognized.

Although described in the context of AR applications that share AR objects amongst session participants, those skilled in the art will appreciate that the techniques described herein also may be applied to other types of multi-player applications including co-located players who may capture the full-body gestures of other co-located players. Accordingly, the process described herein for detecting full-body gestures corresponding to a gesture event, determining which participant triggered the gesture event, and propagating the gesture event among co-located participants is not limited to AR applications but may be applied to any such multi-player applications including co-located players.

Techniques described herein also may be used with one or more of the computer systems described herein or with one or more other systems. For example, the various procedures described herein may be implemented with hardware or software, or a combination of both. At least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an ASIC. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionalities, as described herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor to constitute a particular module at one instance of time and to constitute a different module at a different instance of time.

While the machine-readable medium may be a single medium, the term "machine-readable medium" may include a single medium or multiple media (e.g., at least one of a centralized or distributed database, or associated caches and servers) configured to store the one or more instructions. The term "machine-readable medium" may include any medium that is capable of storing, encoding, or carrying instructions for execution by a processor such as CPU 210 and that cause the CPU 210 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and Digital Video Disks (DVD)-ROM disks. In some examples, machine-readable media may include non-transitory machine-readable media. In some examples, machine-readable media may include machine-readable media that is not a transitory propagating signal.

Example communication networks that may be implemented by the mobile device may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the short range transceivers 255 and the WWAN transceivers 250 may include a plurality of antennas to wirelessly communicate using at least one of single-input multiple-output (SIMO), multiple-input multiple-output (MIMO), or multiple-input single-output (MISO) techniques. In some examples, a network interface device may wirelessly communicate using Multiple User MIMO techniques.

The features and flow charts described herein can be embodied in one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application can invoke API (Application Programming Interface) calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are the best mode and other examples, it is understood that various modifications may be made therein and that the subject matter disclosed herein may be implemented in various forms and examples, and that they may be applied in numerous applications, only some of which have been described herein. It is intended by the following claims to claim all modifications and variations that fall within the true scope of the present concepts.

What is claimed is:

1. A mobile device, comprising:
   a camera;
   a memory that stores instructions; and
   a processor coupled to the memory, wherein the processor executes the instructions to implement a gesture event corresponding to a detected gesture by executing instructions to perform operations including:
   generating a multi-party session including at least two co-located session participants, the multi-party session enabling all session participants to communicate with one another using respective mobile devices;
   the camera detecting a gesture event of a co-located session participant;
   capturing a screen-space position of a head of the co-located session participant who generated the gesture event;
   comparing the captured screen-space position of the head of the co-located session participant who generated the gesture event to a screen-space position of each co-located participant in the multi-party session;
   determining a user identification (ID) of the co-located participant that is closest to the screen-space position of the head of the co-located session participant who generated the gesture event;
   broadcasting the detected gesture event and the determined user ID to at least the co-located session participants in the multi-party session; and
   handling the detected gesture event in accordance with a nature of the gesture event and the determined user ID of the co-located session participant who generated the gesture event.

2. The mobile device of claim 1, wherein the detected gesture event is a full-body gesture, an upper body gesture, or a lower body gesture of the co-located session participant.

3. The mobile device of claim 2, wherein the detected gesture event comprises a T-pose, a waving hand, or a foot click.

4. The mobile device of claim 1, wherein handling the detected gesture event comprises the processor executing instructions to determine whether the mobile device corresponds to the user ID of the co-located session participant who generated the gesture event and to perform an action in the multi-party session that responds to the detected gesture event from the determined user ID.

5. The mobile device of claim 1, wherein the detected gesture event triggers a full screen effect on a mobile device of at least one session participant, visual effects attached to a body of at least one session participant, toggling of an object in the session, or playing of an animation in the session.

6. The mobile device of claim 1, wherein the processor executing the instructions to generate a multi-party session including at least two co-located session participants comprises the processor executing instructions to generate a multi-party augmented reality (AR) session for sharing at least one AR application amongst the at least two co-located session participants.

7. The mobile device of claim 1, wherein the processor executing instructions to detect the gesture event of the co-located session participant comprises the processor executing instructions to determine if there is a tracked body detected in an image received from the camera, to determine whether the detected tracked body is performing gestures, and to determine the gesture event from gestures performed by the detected tracked body.

8. The mobile device of claim 1, wherein the processor executing instructions to compare the captured screen-space position of the head of the co-located session participant who generated the gesture event to the screen-space position of each co-located participant in the multi-party session comprises the processor executing instructions to (a) obtain session data relating to a first participant from a list of co-located participants in the multi-party session, (b) determine a screen-space position of the first participant, (c) compare the screen-space position of the head of the co-located session participant who generated the gesture event to the screen-space position of the first participant, and (d) repeat steps (a)-(c) for each co-located participant in the multi-party session.

9. The mobile device of claim 8, wherein the processor executing instructions to determine the user ID of the co-located participant that is closest to the screen-space position of the head of the co-located session participant who generated the gesture event comprises the processor executing instructions to determine the closest co-located participant in the multi-party session having a screen-space position that is closest to the screen-space position of the co-located session participant who generated the gesture event and to determine the user ID of the closest co-located participant.

10. A method of implementing a gesture event corresponding to a detected full-body gesture, comprising:
generating a multi-party session including at least two co-located session participants, the multi-party session enabling all session participants to communicate with one another using respective mobile devices;
detecting, using a camera of a mobile device, a gesture event of a co-located session participant;
capturing a screen-space position of a head of the co-located session participant who generated the gesture event;
comparing a captured screen-space position of the head of the co-located session participant who generated the gesture event to a screen-space position of each co-located participant in the multi-party session;
determining a user identification (ID) of the co-located participant that is closest to the screen-space position of the head of the co-located session participant who generated the gesture event;
broadcasting the detected gesture event and the determined user ID to at least the co-located session participants in the multi-party session; and
handling the detected gesture event in accordance with a nature of the gesture event and the determined user ID of the co-located session participant who generated the gesture event.

11. The method of claim 10, wherein the detected gesture event is a full-body gesture, an upper body gesture, or a lower body gesture of the co-located session participant.

12. The method of claim 11, wherein the detected gesture event comprises a waving hand, a foot click, or a T pose.

13. The method of claim 10, herein handling the detected gesture event comprises determining whether the mobile device corresponds to the user ID of the co-located session participant who generate the gesture event and performing an action in the multi-party session that from the determined user ID.

14. The method of claim 10, further comprising triggering, in response to the detected gesture event, a full screen effect on a mobile device of at least one session participant, visual effects attached to a body of at least one session participant, toggling of an object in the session, or playing of an animation in the session.

15. The method of claim 10, wherein generating the multi-party session including at least two co-located session participants comprises generating a multi-party augmented reality (AR) session for sharing at least one AR application amongst the at least two co-located session participants.

16. The method of claim 10, wherein detecting the gesture event of the co-located session participant comprises determining if there is a tracked body detected in an image received from the camera of the mobile device, determining whether the detected tracked body is performing gestures, and determining the gesture event from gestures performed by the detected tracked body.

17. The method of claim 10, wherein comparing the captured screen-space position of the head of the co-located session participant who generated the gesture event to the screen-space position of each co-located participant in the multi-party session comprises (a) obtaining session data relating to a first participant from a list of co-located participants in the multi-party session, (b) determining a screen-space position of the first participant, (c) comparing the screen-space position of the head of the co-located session participant who generated the gesture event to the screen-space position of the first participant, and (d) repeat steps (a)-(c) for each co-located participant in the multi-party session.

18. The method of claim 17, wherein determining the user ID of the co-located participant that is closest to the screen-space position of the head of the co-located session participant who generated the gesture event comprises determining the closest co-located participant in the multi-party session having a screen-space position that is closest to the screen-space position of the co-located session participant who generated the gesture event and determining the user ID of the closest co-located participant.

19. A non-transitory computer-readable storage medium that stores instructions that when executed by at least one processor cause the at least one processor to implement a gesture event corresponding to a detected full-body gesture by performing operations including:

generating a multi-party session including at least two co-located session participants, the multi-party session enabling all session participants to communicate with one another using respective mobile devices;

detecting, using a camera of a mobile device, a gesture event of a co-located session participant;

capturing a screen-space position of a head of the co-located session participant who generated the gesture event;

comparing a captured screen-space position of the head of the co-located session participant who generated the gesture event to a screen-space position of each co-located participant in the multi-party session;

determining a user identification (ID) of the co-located participant that is closest to the screen-space position of the head of the co-located session participant who generated the gesture event; and broadcasting the detected gesture event and the determined user ID to at least the co-located session participants in the multi-party session; and handling the detected gesture event in accordance with a nature of the gesture event and the determined user ID of the co-located session participant who generated the gesture event.

20. The non-transitory computer-readable storage medium of claim 19, further comprising instructions that when executed by the at least one processor cause the at least one processor to generate the multi-party session by generating a multi-party augmented reality (AR) session for sharing at least one AR application amongst the at least two co-located session participants.

* * * * *